United States Patent [19]

Simpson

[11] Patent Number: 4,635,999
[45] Date of Patent: Jan. 13, 1987

[54] VEHICLE SEATS

[75] Inventor: Leslie J. Simpson, Amersham, England

[73] Assignee: Flight Equipment and Engineering Ltd., Buckinghamshire, England

[21] Appl. No.: 545,243

[22] Filed: Oct. 25, 1983

[30] Foreign Application Priority Data

Oct. 28, 1982 [GB] United Kingdom ................. 8230858
Apr. 19, 1983 [GB] United Kingdom ................. 8310490

[51] Int. Cl.⁴ .......................... A47C 1/02; A47C 1/035
[52] U.S. Cl. ....................................... 297/88; 297/68; 297/328; 297/433; 297/434
[58] Field of Search ....................... 297/68, 83, 84, 88, 297/90, 75, 344, 328, 327, 429, 433, 434, 437

[56] References Cited

U.S. PATENT DOCUMENTS

| | | | |
|---|---|---|---|
| 179,859 | 7/1876 | Kubitschky et al. | 297/328 |
| 403,417 | 5/1889 | Chappell | 297/68 |
| 1,156,725 | 10/1915 | Turner | 297/90 |
| 2,174,622 | 10/1939 | Dale | 297/432 |
| 2,751,970 | 6/1956 | Smith | 297/344 |
| 3,061,366 | 10/1962 | Schliephacke | 297/88 |
| 3,198,575 | 8/1965 | Hawkins | 297/328 |
| 3,253,858 | 5/1966 | Degen | 297/328 |
| 3,284,134 | 11/1966 | Malitte | 297/391 |
| 3,414,324 | 12/1968 | Taylor et al. | 297/68 |
| 3,934,929 | 1/1976 | Rabinowitz | 297/90 |
| 3,950,026 | 4/1976 | Van Seenus | 297/328 |
| 4,046,419 | 9/1977 | Schmitt | 297/328 |
| 4,168,050 | 9/1979 | Nerem et al. | 297/328 |
| 4,198,094 | 4/1980 | Bjerknes et al. | 297/328 |
| 4,451,082 | 5/1984 | Giordani | 297/68 |

FOREIGN PATENT DOCUMENTS 260525  6/1913  Fed. Rep. of Germany ........ 297/68

Primary Examiner—William E. Lyddane
Assistant Examiner—Mark W. Binder
Attorney, Agent, or Firm—Watson, Cole, Grindle & Watson

[57] ABSTRACT

A reclinable vehicle seat that can be used in an aircraft comprises a bottom part and a back support part which are rotatable together about an axis which extends transversely to the seat and is below and towards the rear bottom part. A hydraulic cylinder is provided to secure the parts in positions angularly spaced about the axis. The back support part may additionally be pivoted about the same or a different transverse axis in relation to the bottom part. The seat preferably includes a leg support part extending downwardly from or adjacent to the front edge of the bottom part, which optionally includes a foot rest. The leg support part may be fixed or pivoted in relation to the bottom part so as to extend forwardly and downwardly when the seat is tilted rearwardly of its normal upright position.

7 Claims, 6 Drawing Figures

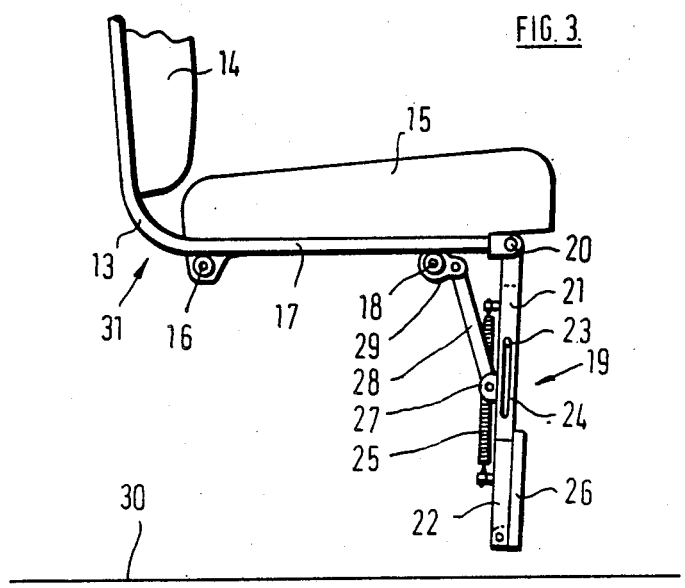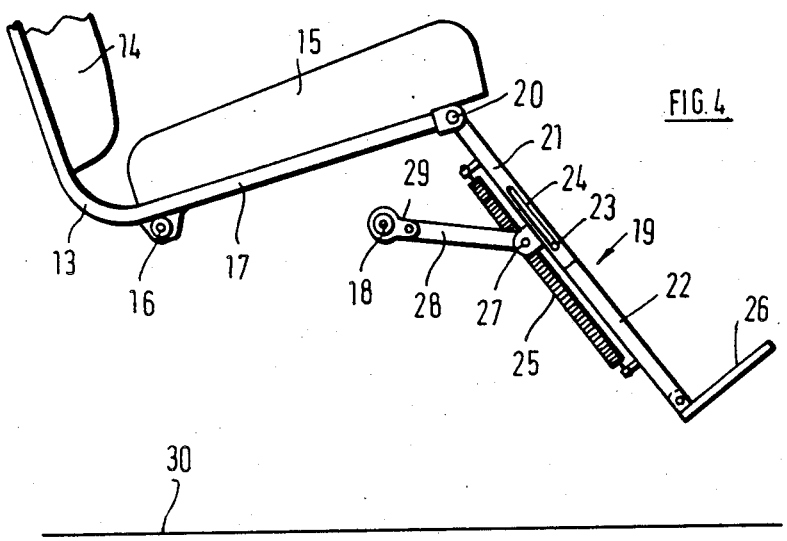

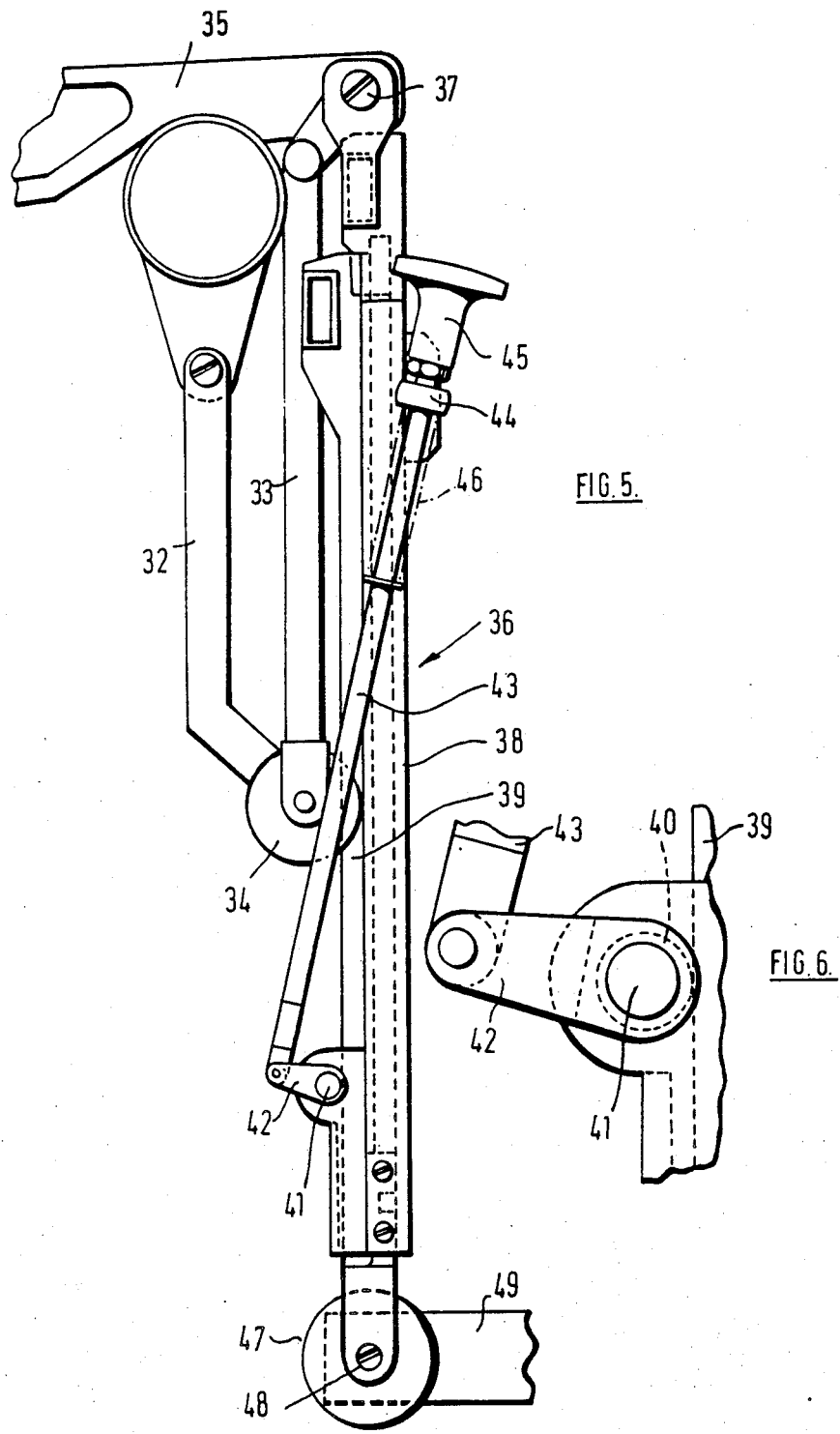

VEHICLE SEATS

BACKGROUND TO THE INVENTION

Vehicle seats are often occupied for extended periods of time and it is therefore desirable that they should be adjustable in position and/or in the relative disposition of their parts so that the occupants of a seat can choose the most comfortable arrangement to suit his or her anatomy and for different purposes such as sleeping or reading. To this end, vehicle seats are often made with adjustable parts which can be fixed in different positions so that occupants can adopt various upright or reclined postures. For example, seats may have hinged back supports which can be fixed at different inclinations, sometimes with simultaneous tilting of the seat bottom.

Operational requirements of vehicles, however, place limitations on the extent to which adjustability can be provided. For example, in commercial aircraft, operating costs are such that the space between rows of seats should be minimal compatible with providing degrees of passenger comfort appropriate to certain recognised classes of fare. Fares are naturally related to the number of passengers that can be accommodated in an aircraft, so the spacing of seat rows is a crucial factor in determining fares. Improving comfort without increasing the spacing of seat rows, or reducing the spacing whilst maintaining comfort can thus have important advantages for the aircraft operator. However, with current designs of adjustable seat, this minimal row spacing may limit the angle through which a back support can be permitted to be moved between upright and reclining positions. It may also preculde the provision of support for the legs of seat occupants, which is desirable for maximum comfort to be achieved when a back support is inclined backwardly to allow the occupant of a seat to adopt a reclining posture.

PRIOR ART

Various kinds of adjustable or reclining seats are of course known, but because of the complicated mechanisms which are often involved, as well as the factors mentioned above, their use is generally confined to the more expensive classes of travel.

In U.S. Pat. No. 2,174,622 there is described an aircraft chair (seat) having a retractable leg and foot rest. The leg and foot rest comprises two upholstered parts hinged together so that they can be extended more or less in line or folded close together. The leg and foot rest is slidably mounted on arcuate tracks beneath the seat bottom part of the seat so that when the parts are folded they may be retracted beneath the seat bottom part. In this retracted position they occupy the space beneath the seat, which, in cheaper classes of travel, is often required to accommodate luggage and/or the feet of an occupant of a seat behind. The seat may have a reclining back and an adjustable seat bottom.

U.S. Pat. No. 2,629,425 discloses a chair (seat), primarily for use in vehicles such as aircraft, having back and seat bottom portions hinged together and connected by a pivoted linkage so that they can be tilted coincidentally, but not through the same angles, into various reclining or upright positions. The back may also be swung to lie horizontally in line with the seat bottom so as to form a berth. In the embodiment discribed, the connecting linkage and hydraulic control gear are somewhat complex and occupy a substantial part of the space below the seat bottom which might otherwise accommodate luggage. It also appears likely that the linkage and hydraulic control gear would increase the weight of the seats to an uneconomical extent.

U.S. Pat. No. 3,284,134 discloses a seat for use (inter alia) in aircraft comprising a body having a back portion and a seat portion, a support for the body and an adjustable connection between the body and the support adapted to permit combined downward and forward movement of the back portion simultaneously with combined forward and upward movement of the seat portion. In a preferred embodiment described in the said specification, the back portion and seat portion are integral and the support includes side members each having two straight slots. The body is mounted on a carriage having two rollers at each side to engage and travel along the respective slots. The slots near the front of the side members slope forwards and upwards whilst those near the rear slop forwards and downwards. Thus the body is enabled to be moved relative to the support to provide the said combined movements of the back and seat portions. The rollers include friction brake arrangements to prevent movement between the body and the support except when force is applied by the user of the seat.

This arrangement provides a degree of reclining movement of the seat, but because of the mounting arrangement the seat portion moves forward during the noted movement whilst the back portion moves substantially vertically downward. Thus the spacing between the front of one seat and the back of an adjacent seat—the crucial row spacing previously mentioned, would undesirably be reduced.

In more usual adjustable seats, the bottom part is fixed and the back support has a limited degree of angular movement.

BRIEF SUMMARY OF THE INVENTION

According to this invention, a vehicle seat comprises a bottom part and a back support part, the noted parts being rotatable together about an axis transverse to the seat and adjacent to the bottom part and means are provided for securing the parts in positions angularly spaced about the axis.

With this arrangement, when the back support part is tilted rearwardly from the normal substantially upright position, the bottom part is also tilted upwardly at the front. This tends to restrain the occupant from moving forwardly in the seat and permits a comfortable reclining posture, even when the spacing between rows of seats is as little as 812.8 mm (32 in.). Because of the location of the axis adjacent to the bottom part, for example immediately below it, there is no significant longitudinal displacement of the bottom part during rotation. Consequently the effective spacing between rows of seats is not significantly affected by the angular positions of seats in different rows.

The back support part may additionally be pivoted in relation to the bottom part, i.e., about the same or a different transverse axis, through a limited angle. This additional provision enables the seat occupant to have a wider choice of postures, but may require somewhat greater spacing between rows of seats.

The seat preferably includes a leg support part extending downwardly from or adjacent to the front edge of the bottom part. This leg support part may be fixed in relation to the bottom part and arranged more or less vertically, below or somewhat rearwardly of the front edge of the bottom part when the latter is in its normal position, so as not to obstruct the legs and feet of the occupant. However, when the bottom part is tilted upwardly as mentioned, the leg support part will be swung forwardly so as to support the legs of the occupant in a comfortable position. The leg support part may include a foot rest at or near its bottom edge, which may be hinged or retractable or adjustably mounted on the leg support part.

Alternatively, a leg support part may be arranged to depend from a pivot axis transverse to the seat and adjacent to the front edge of the bottom part. A pivoted linkage, connected between the seat and a point fixed in relation thereto, for example on a supporting frame, may be arranged to swing the leg support part forwardly when the seat is tilted rearwardly, through a greater angle than the angle through which the seat is tilted.

With this arrangement, the angle between the bottom part and the leg support part, initially about 90° when the seat is in its normal position with the back support part substantially upright, increases as the seat is tilted rearwardly, providing improved support for the legs of an occupant of the seat. Furthermore, the initial angle may be less than 90° so that the leg support part is well clear of the legs and feet of an occupant when the seat is in its normal position and does not obstruct passengers moving into or out of seats.

The leg support part is preferably adjustable in length so that it may be extended when swung forwardly as described but can be retracted to clear the floor of the vehicle when the seat is in its normal position. Also, the leg support part preferably includes a foot rest at or near its bottom end, hinged or otherwise mounted so as to be movable between an operative position more or less perpendicular to the leg support part and a stowed position in which it lies close against the leg support part or is otherwise clear of the legs and feet of an occupant of the seat.

BRIEF DESCRIPTION OF THE DRAWINGS

Embodiments of the invention are illustrated by way of example by the accompanying drawings in which:

FIG. 3 is a side elevation of parts of another vehicle seat including a leg support part, shown in its normal position, FIG. 4 is a similar view showing the disposition of the parts when the seat is tilted rearwardly, FIG. 5 is a fragmentary side elevation of a part of yet another vehicle seat including a leg support part and a foot rest, shown in the normal upright position of the seat, and FIG. 6 is a fragmentary view showing a detail of FIG. 5 to a larger scale.

DETAILED DESCRIPTION OF THE PREFERRED EMBODIMENTS

For clarity, supporting frames, arm rests and other components not particularly concerned with the invention are omitted from the drawings.

Figure 1:
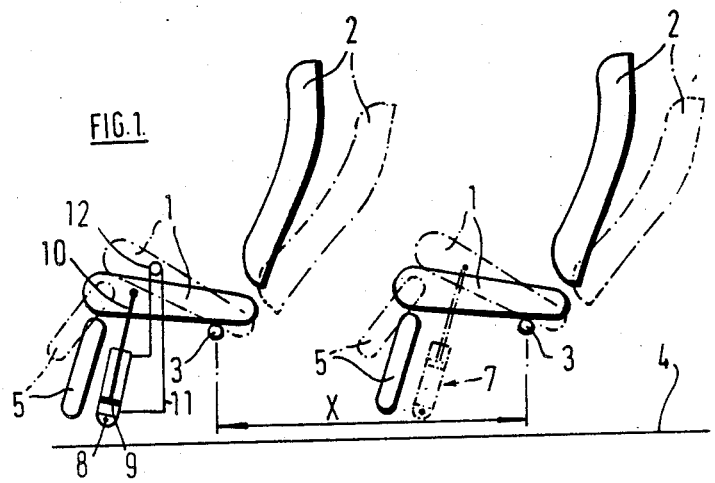
FIG. 1 is a diagrammatic sketch showing two aircraft seats in side elevation.

In FIG. 1, seats in two adjacent rows are shown, each comprising a bottom part 1 and a back support part 2, secured together and mounted by means (not shown) so as to be rotatable together about a fixed transverse axis 3 below the bottom part 1 and adjacent to the bottom edge of the back support part 2. The seats are shown in full line in their normal upright positions in relation to the floor 4 of the aircraft cabin to which they are secured. The dimensions of the seats may be related to the spacing X between the axes 3, which is 812.8 mm. (32 in.).

Extending downwardly below the front edge of the bottom part 1 of each seat is a leg support part 5 which, in the upright position of the seat, is inclined slightly to the vertical so as to be clear of the legs and feet of an occupant of the seat when in a normal sitting position with the feet resting on the floor 4.

The parts 1, 2 and 5 of each seat are fixed relative to one another, but the seat can be rotated bodily about the axis 3 through an angle of approximately 18° to a reclining position which is shown in chain dotted lines. Securing means are provided to lock the seat in any angular position between the upright and reclincing positions shown, according to the requirements of the occupant. As illustrated, the securing means may comprise a hydraulic cylinder 7 pivotally connected by a pin 8 at its lower end to a fixed part such as a part of the seat supporting frame (not shown). Within the cylinder 7 is a double-acting piston 9 pivotally connected to the bottom part 1 of the seat near its front end by a rod 10. Hydraulic fluid pipe connections 11 lead from each end of the cylinder to a control valve 12 conveniently positioned for operation by an occupant in the seat. The cylinder and the connections 11 and valve 12 are filled with hydraulic fluid, and it will be understood that when the control valve 12 is open the piston 9 can move along the cylinder, displacing hydraulic fluid from one end to the other of the cylinder through the connections 11 and control valve 12. However, when the control valve 12 is closed the piston will be locked against movement and thus lock the seat against rotation about the axis 3.

The control valve 12 may be a spring-closed valve which can be opened by an occupant of the seat by means of a press button or like control when it is desired to rotate the seat about the axis 3 but which, when closed, will lock the seat in any desired position between the upright and reclined positions shown.

As the back support part 2 is tilted rearwardly from the upright position towards the reclining position, the bottom part 1 is tilted upwardly about the axis 3 and the leg support part 5 is swung forwardly so as to support the legs and feet of the occupant, which may be lifted clear of the floor 4 by the upward tilting of the bottom part. The location of the axis 3 immediately below and towards the rear of the seat bottom part 1 ensures that the latter is not significantly moved longitudinally during tilting of a seat. The space between the seats and below the rear parts of the seat bottoms is substantially unaltered. Thus the comfortable accommodation of the legs and feet of the occupant of one seat is not affected by tilting of the seat in front. As can be seen in the drawing, despite the short spacing X between the axes 3, the occupant of each set can choose to have it in any angular position between the two positions shown without inconveniencing an occupant of the adjacent seat and regardless of the position of the other seat. In the reclining position of a seat, shown in chain dotted lines, the occupant is restrained against forward movement by the upward tilting of the bottom part 1 and can adopt a comfortable reclining position with the legs supported, which is not usually possible in seats with the narrow spacing shown.

Instead of the hydraulic securing means described and illustrated, other kinds of securing means may be provided. For example a pneumatic piston and cylinder arrangement or a mechanical detent.

Figure 2:
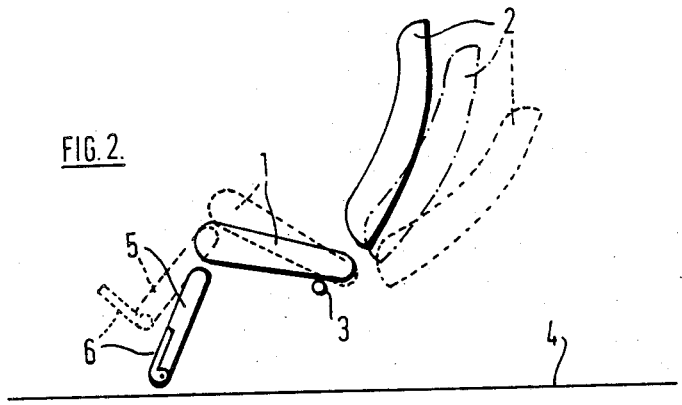
FIG. 2 is a diagrammatic sketch showing a different seat.

FIG. 2 shows a modified seat in which, in addition to the facility for bodily rotation of the seat about the transverse axis 3, the back support part 2 is permitted a limited degree of rotation about the same axis relative to the bottom part 1. The normal upright position of the seat is shown in full lines, as in FIG. 1. In this modified seat, the back support part 2 is hinged relative to the bottom part 1 so that the back support part 2 can be tilted rearwardly to the position shown in chain dotted lines whilst the bottom part 1 and the leg support part 5 remain in the full line position. The parts may then be rotated together to the further reclining position shown in dotted lines. Either motion may be partially or completely effected with or without the other, securing means being arranged to lock the back support part 2 in any desired angular relation to the bottom part 1 within the permitted limits shown, and to secure the seat bodily in any angular position between the upright and reclining positions.

This modified seat requires somewhat greater spacing between adjacent rows of seats than that shown in FIG. 1, but provides a greater choice of postures for the occupant than is usually possible with such spacing between rows of conventional seats.

Instead of the rotation of the back support part 2 relative to the bottom part 1 being about the same axis 3 as the bodily rotation of both parts together, it may be about a separate transverse axis spaced from the axis 3.

As shown in FIG. 2, the leg support part 5 may include a foot rest 6 hinged to its bottom end. The foot rest 6 is normally folded to lie flush with the surface of the leg support part, which is recessed to accommodate it, but can be swung out substantially perpendicular to the surface when required for use. The foot rest provides additional support for the occupant of a seat against moving forwardly in the seat when in a reclining posture. Instead of being hinged to the leg support part, the foot rest 6 could be slidably or otherwise adjustably mounted thereon.

The seat shown in FIGS. 3 and 4 comprises a tubular frame 13 on which is mounted a back support cushion 14 and a bottom cushion 15. The tubular frame 13 is rigid and is pivotally mounted on a transverse support tube 16 which is secured to a vehicle. In the normal position shown in FIG. 3 in which the back support cushion 14 is substantially upright, the bottom parts 17 of the side tubes of the frame rest on and are supported by a second support tube 18 extending parallel to and conveniently spaced from the support tube 16, which is also secured to the vehicle.

A leg support part 19 is pivotally connected to the front ends of the bottom parts 17 of the side tubes of the frame by pins 20, and in the normal position of the seat hangs substantially vertically below and behind the front edge of the bottom cushion 15 so as to be clear of the legs and feet of an occupant of the seat. The leg support part 19 comprises a first portion 21 connected to the pivot pins 20 and a second portion 22 slidably connected to the first portion 21 by a pin 23 and slot 24. The second portion 22 is urged towards the retracted position shown in FIG. 3 by a tension spring 25, but can be extended by foot pressure to overcome the tension of the spring. A foot rest 26 is pivotally connected to the bottom end of the leg support part 19 and is urged towards its stowed position shown in FIG. 3 by a torsion spring (not shown). It may be swung forwardly against the action of the spring to an operative position substantially perpendicular to the leg support part 19, as shown in FIG. 4, for example by an occupant of the seat applying pressure with the heels.

A lug 27 is formed on the rear of the first portion 21 of the leg support part 19, near its lower end, and is pivotally connected to a rigid swinging link 28 to a lug 29 rigidly secured to the front support tube 18.

The seat may be tilted rearwardly by an occupant, by leaning backwardly and pressing downwardly on the floor 30 of the vehicle with the feet and/or with the arms on arm rests (not shown) fixed to the support tubes 16 and 18. Conveniently, this tilting movement may be controlled by a hydraulic piston and cylinder arrangement (not shown) connected between the support tube 18 and the frame 13, with a control valve operated by a button mounted in the arm rest. The rearward travel of the back support part of the frame 13 is limited by stops (not shown) secured to the rear support tube 16 or to a part of the vehicle so as to locate the maximum reclined position of the seat.

FIG. 4 shows the maximum reclined position, and it can be seen that the leg support part 19, originally substantially perpendicular to the bottom parts 17 of the side tubes of the frame 13 in the normal position of the seat, has swung forwardly to lie at an obtuse angle to the bottom parts 17. This is due to the connecting swinging link 28. As the seat is tilted rearwardly, the bottom parts 17 of the frame swing upwardly clear of the support tube 18 and the link 28 consequently swings upwardly about its pivot in the lug 29, so causing the leg support part 19 to swing forwardly about the pins 20. The pivot in the lug 29 is positioned so as to be above the pivot in the lug 27 in all positions of the seat so that the angle between the bottom parts 17 of the frame 13 and the leg support part 19 continuously increases throughout the reclining movement of the seat from its normal position to the maximum reclined position.

The location of the single axis of rotation of the seat, the axis of the support tube 16, again ensures that tilting of the seat does not significantly affect the space available to accommodate the legs and feet of an occupant in a seat behind.

The torsion spring urging the foot rest 26 towards its stowed position is relatively weak so as not to produce undue upward pressure on the feet of an occupant of the seat, but is sufficient to swing the foot rest to its stowed position as soon as the occupant's feet are removed from it. The tension in the spring 25 is balanced by the weight of the occupant's legs and feet in reclined positions of the seat and a comfortable equilibrium position is readily found by the occupant.

FIGS. 5 and 6 shows parts of another seat having a pivoted leg support part arranged somewhat similarly to that shown in FIGS. 3 and 4. The front end of a support 35 for the seat bottom cushion (not shown) is illustrated in the normal upright position of the seat in which it rests upon and is supported by a transverse tube secured to a vehicle, like the tube 18 in FIG. 3. Towards its rear end, the support 35 is pivoted on a second transverse tube similar to the tube 16 in FIG. 3 so that the seat can be tilted similarly to the seat shown in that Figure.

A leg support part 36 is pivotally connected by pins 37 to the front end of the supports 35 at each side of the seat which are below and behind the front edge of the seat bottom cushion. Only the components at one side of the seat are shown. In the normal position of the seat, the leg support part 36 hangs substantially vertically from the pivot 37. The leg support part comprises a channel-shaped bar 38 at each side, within which is slidably received an extension bar 39. An upholstered leg support cushion (not shown) is mounted between the bars 38.

Immediately behind the leg support part 36 is a linkage to swing the leg support part forwardly when the seat is tilted rearwardly. The linkage comprises a first cranked link or rod 32 pivotally connected by one end to a fixed lug on the transverse tube supporting the front end of the support 35 and by its other end to one end of a second link or rod 33 which in turn is pivotally connected by its other end to a lug on the front end of the support 35, behind and below the pivot 37. A wheel 34 is rotatably mounted on the pivot pin connecting the rods 32 and 33 and engages a rear surface of the bar 38.

When the seat is tilted rearwardly, the front end of the support 35 rises off the transverse tube, causing the rods 32 and 33 to swing forwardly. The wheel 34, engaging the bar 38, swings the latter forwardly so that the leg support cushion is positioned to support the legs of an occupant of the seat. The geometry of the linkage is such that the bar 38 swings through a greater angle than the angle through which the seat is tilted. When the seat is returned to its normal upright position, the linkage is returned to the position shown, but the bar 38 may remain in its forward position, as will be described.

A tension spring (not shown) is connected between the bars 38 and 39 to urge the latter towards its fully-retracted position in the bar 38. At the end of the extension bar 39 a wheel 47 is mounted on a spindle 48, and between the spindles 48 at each side of the seat is mounted a foot rest 49. The foot rest 49 is shown in its operative position, substantially perpendicular to the bar 39, but it can be swung about the spindle 48 to an inoperative position between the bars 39.

By applying foot presure to the foot rest 49, the occupant of the seat can extend the bar 39 relative to the bar 38 against the action of the tension spring so as to locate the foot rest in a comfortable position. To remove the spring pressure from the occupant's feet when a comfortable position has been achieved, an eccentric cam 40 is mounted by its spindle 41 in a lug on the rear of the lower end of the bar 38 and frictionally engages the rear of the extension bar 39 (see FIG. 6). An arm 42 is connected to the spindle 41 and its end is pivotally connected to a control rod 43 which passes through a guide eye 44 near the top of the bar 38 and carries a knob 45 conveniently positioned for operation by the hand of an occupant of the seat. A compression spring 46 surrounds the control rod 43 between the guide eye 44 and a collar on the rod so as to urge the rod 43 downwardly towards the position shown in which the cam 40 locks the bar 39 in the bar 38. The compression spring 46 and the tension spring between the bars 38 and 39 both tend to rotate the cam 40 in an anti-clockwise direction so that it jams against and locks the bar 39. However, if the seat occupant applies sufficient downward pressure on the foot rest 49, the cam can be rotated slightly clockwise so as to free the bar 39 and enable it to be extended as mentioned. As soon as the downward pressure is released the cam will again lock the bar 39.

To enable the bar 39 to be retracted, the occupant can pull the knob 45 up against the compression spring 46, so rotating the cam in a clockwise direction and releasing the bar 39 which will then be retracted by the tension spring. Thus the seat occupant can readily extend or retract the extension bar at will.

Should the extension bars 39 be extended when the seat is moved from a reclined position to its normal upright position, the wheels 47 may engage the floor of the vehicle. The linkage will return to the position shown, but the leg support part 36, being freely pivoted at 37, will swing forwardly whilst the wheels 47 roll along the vehicle floor, thus avoiding any damage to the leg support part. Then, by pulling up the knob 45, the bars 39 may be retracted by the tension spring, whereupon the leg support part may also swing back to the position shown, and the foot rest 49 can be moved to its inoperative position clear of the legs and feet of a seat occupant. A light tension spring may be mounted on the spindle 48 to urge the foot rest 49 towards its inoperative position.

Instead of a tension spring for retracting the bars 39 a pneumatic or hydraulic piston and cylinder arrangement may be used.

In all the embodiments described, the seat frame connecting the bottom part and the back support part of a seat may include a "break forward" connection enabling the back support part to swing forwardly relative to the bottom part in the event of impact from behind. This is a standard provision in aircraft seats to protect passengers from injury in the event of a crash or other severe deceleration of the aircraft, and forms no part of the present invention.

I claim:

1. A combined support means and seat, said support means including a first support element defining a first axis and a second support element defining a second axis; and said seat comprising
    a bottom part which includes front and rear edges and includes mounting means near said rear edge which is mounted on said first support element such that said seat can be rotated about said first axis between an upright positioning and a reclining positioning,
    a back support part,
    a connecting means connecting said back support part to the rear edge of said bottom part,
    securing means securing said bottom part and said back support part in selective rotational positions about said first axis,
    a leg support part which includes an upper end that is connected to the bottom part adjacent its front edge to be rotatable relative thereto, and
    a linkage system for controlling the orientation of said leg support part relative to said bottom part when said seat rotates about said first axis, wherein said linkage system includes a first link having upper and lower ends and a second link having upper and lower ends, wherein the upper end of said first link is connected to said bottom part adjacent its front edge so as to be rotatable relative thereto, wherein the upper end of said second link is connected to said second support means so as to be rotatable about said second axis, wherein the bottom ends of said first and second links are connected together to enable said links to rotate relative to one another, and wherein said linkage system also includes abutment means associated with the lower ends of said first and second links for contacting said leg support part and for causing it to rotate forwardly relative to said bottom part when said seat is rotated about said first axis into its reclining positioning.

2. A combined support means and seat as claimed in claim 1, wherein said connecting means includes a pivotal means which allows said back support to be tilted in relation to said bottom part through a limited angle.

3. A combined support means and seat as claimed in claim 2, including further means for selectively securing the back support part relative to the bottom part.

4. A combined support means and seat as claimed in claim 2, wherein said pivotal means coincides with said first axis, which extends transversely to the seat.

5. A combined support means and seat as claimed in claim 1, wherein said leg support part defines a front surface and a rear surface, and wherein said abutment means comprises a wheel rotatably connected to the interconnected lower ends of said first and second links, said wheel being engageable with the rear surface of said leg support part.

6. A combined support means and seat as claimed in claim 1, wherein said leg support part comprises an upper portion and a lower portion having a bottom end, said lower portion being telescopingly movable relative to said upper portion, and wherein a footrest is connected to the bottom end of said lower portion.

7. A combined support means and seat as claimed in claim 6, wherein said support means includes a floor, and wherein said seat includes a rolling element at the bottom end of the lower portion of said leg support part whereby if the seat is rotated from a reclined position towards the upright position whilst the lower portion of said leg support part is extended relative to the upper portion, the rolling element can engage and roll along the floor of said support means.

* * * * *